$$3,196,098$$
Patented July 20, 1965

---

3,196,098
PHOTOPOLYMERIZABLE COMPOSITIONS AND THEIR POLYMERIZATION
Walter E. Mochel, Wilmington, Del., assignor to E. I. du Pont de Nemours and Company, Wilmington, Del., a corporation of Delaware
No Drawing. Filed Oct. 25, 1962, Ser. No. 233,162
18 Claims. (Cl. 204—158)

This invention relates to new photopolymerizable compositions and to a process for polymerizing them.

Photopolymerization, i.e., polymerization brought about by light, is a well-known process that is important in fields such as graphic arts and information storage. In nearly all known photopolymerization systems, the process is a free-radical one, i.e., the actual initiation of the polymerization is by free radicals produced by the action of the light. Such systems have the disadvantages that (a) monomers that do not polymerize by free-radical initiation cannot be used and (b) the polymerization is subject to inhibition by molecular oxygen.

Cationically initiated polymerization, or, as it is usually termed, cationic polymerization, together with the compounds that undergo it, is well known in the art. See, for example, Flory, "Principles of Polymer Chemistry," pages 217 ff. (Cornell, 1953); D'Alelio, "Fundamental Principles of Polymerization," pages 341 ff. (Wiley, 1952); and Billmeyer, "Textbook of Polymer Chemistry," pages 263 ff. (Interscience, 1957). Compounds conventionally used as initators for this type of polymerization are Lewis acids, i.e., compounds that can accept a pair of electrons. Well-known examples are aluminum chloride, boron trifluoride, stannic chloride, titanium tetrachloride, hydrogen fluoride, and sulfuric acid.

It has now been found that a selected class of boron compounds, defined below, are effective as photoinitiators for cationic polymerization, i.e., they initiate cationic polymerization in the presence of light. Therefore, the present invention involves a novel composition comprising as essential ingredients a silver (I) or cerium (III) salt of a substituted decahydrodecaborate or dodecahydrododecaborate and a substance capable of cationically initiated polymerization. The present invention is also directed to the use of the boron initator in the photopolymerization of the cationically polymerizable substance by exposure to actinic light of wave lengths between 2500 A. and 7000 A. In a preferred embodiment the process is used to prepare a relief image.

The boron compounds that act as initiators in the compositions of the invention are compounds of the formula (1) $\quad M_2(B_nH_{n-p-q}X_pY_q)_m$ where M is silver (I) or cerium (III);
X is halogen;
Y is hydroxyl, hydrocarbyloxyalkoxy in which any unsaturation is aromatic, i.e., free of aliphatic unsaturation, or hydrocarbylcarbonyl in which any unsaturation is aromatic;
n is 10 or 12;
p is a cardinal number of 1–12, inclusive, being equal to n minus q when q is greater than zero;
q is 0, 1, or 2;
p+q is at most equal to n; and
m is the valence of M.

When p is greater than 1, the halogens represented by X can be the same or different.

Subgenerically, the initiator components of the invention can be represented as being selected from the following class of compounds:

(2) $\quad M_2(B_{12}H_{12-p-q}X_pY_q)_m$ and (3) $\quad M_2(B_{10}H_{10-p-q}X_pY_q)_m$ where M, X, Y, p, q, and m are defined as above.
When $n=p+q$, the formulas become:

(4) $\quad M_2(B_{12}X_pY_q)_m$ and (5) $\quad M_2(B_{10}X_pY_q)_m$ where M, X, Y, p, q, and m as defined above.
In addition, when $q=0$ the formulas become:

(6) $\quad M_2(B_{12}H_{12-p}X_p)_m$ and (7) $\quad M_2(B_{10}H_{10-p}X_p)_m$

When $n=p$, Formulas 6 and 7 become:

(8) $\quad M_2(B_{12}X_{12})_m$ and (9) $\quad M_2(B_{10}X_{10})_m$

THE POLYMERIZABLE SUBSTANCES OF THE COMPOSITION

Substances that undergo cationic polymerization include compositions containing ethylenic unsaturation (i.e., carbon-carbon double bonds) and compositions that polymerize by ring opening of cyclic groups (e.g., cyclic ethers and imines, lactones, and lactams.

Each of these chemical types in turn can be divided into two groups. The first group comprises individual chemical compounds, or "monomers," as they are frequently referred to. Customarily, in this connection, the terms "compound" and "monomer" are applied only to substances that are single chemical compounds, or, less commonly, mixtures of single chemical compounds present in known proportions. If such compounds are formed by polymerization reactions, the number of repeating units in the structure is usually relatively low, e.g., usually about four or five at most.

Most ethylenically unsaturated compounds capable of cationic polymerization, and therefore operable in the present invention, can be represented by the formula

(10) 

where

X and Y are the same or different;
X is free of acetylenic or allenic unsaturation, and is hydrocarbyl, hydrocarbyloxy, halohydrocarbyloxy, hydrocarbylcarbonyloxyhydrocarbyloxy, or oxygen-interrupted hydrocarbyloxy containing a total of 2–4 oxygens; and
Y is hydrogen or lower alkyl.

Other types of ethylenically unsaturated compounds that can undergo cationic polymerization include methyl vinyl ketone, N-vinylpyrrolidone, 1,2-dimethoxyethylene, cyclopentadiene, and methylcyclopentadiene.

For reasons of availability and ease of polymerization, a preferred class of ethylenically unsaturated compounds are those of Formula 10 containing at most 12 carbons. Examples are isobutylene, 1-butene, 2-methyl-1-heptene, 1-dodecene, 1,3-butadiene, isoprene, styrene, vinylcyclohexane, 4-ethylstyrene, 4-isopropenyltoluene, vinyl methyl ether, vinyl ethyl ether, vinyl 2-chloroethyl ether, vinyl 2-ethylhexyl ether, vinyl acetoxymethyl ether, vinyl diisopropylmethyl ether, vinyl decyl ether, vinyl 2-ethoxyethyl ether, vinyl 2-(2-ethoxyethoxy)ethyl ether, vinyl 2-(methoxymethoxy)ethyl ether, vinyl methoxymethyl ether, vinyl butoxymethyl ether, vinyl 2-(butoxymethoxy)ethyl ether, vinyl 6-(methoxymethoxy)hexyl ether, isopropenyl ethyl ether, 1-ethylvinyl ethyl ether, 1-pentylvinyl methyl ether, vinyl 2-vinyloxyethyl ether, the divinyl ether of triethylene glycol, vinyl allyl ether, vinyl 4-butylcyclohexyl ether, vinyl benzyl ether, vinyl 3-phenylpropyl ether, vinyl 4-chlorobenzyl ethehr, vinyl 1-cyclohexylethyl ether, vinyl tetrahydrofurfuryl ether, vinyl phenyl ether, vinyl naphthyl ether, vinyl 1,2,3,4-tetrahydronaphthyl ether, and vinyl decahydronaphthyl ether.

A more preferred class is composed of compounds that have at most nine carbons and are represented by Formula 10, in which X and Y are the same or different; X is alkyl, alkenyl, aryl, alkaryl, alkoxy, alkoxyalkoxy, alkoxyalkoxyalkoxy, or alkenoxyalkoxyalkoxy; and Y is hydrogen or methyl. All the groups in the preceding sentence are defined as unsubstituted unless otherwise noted.

Because of their relative ease of polymerization and the range of properties of the polymeric products obtainable by polymerizing systems containing them, an especially preferred class of monomers are vinyl ethers containing at most eight carbons and represented by Formula 10, in which X is alkoxy, alkoxyalkoxy, alkoxyalkoxyalkoxy, or alkenoxyalkoxyalkoxy, and Y is hydrogen. The preceding groups are all defined as unsubstituted unless otherwise noted.

Cyclic compounds capable of cationic polymerization, and therefore operable in the present invention, are exemplified by ethylene oxide, propylene oxide, isobutylene oxide, 3,3 - bischloromethyloxetane, trioxane, propiolactone, ethylenimine, N-cyanoethylenimine, ε-caprolactam, pivalolactone, pivalothiolactone, and 2,2-dimethylpropiolactam. The most readily available compounds of this type are those of relatively low carbon content, e.g., those containing at most eight carbons, and therefore cyclic monomers within this class are preferred.

This invention includes systems containing two or more compounds capable of cationic polymerization, and the copolymerization of such mixtures by exposure to actinic light. Examples are mixtures of vinyl methyl ether and vinyl 2-ethylhexyl ether; vinyl ethyl ether and the divinyl ether of diethylene glycol; vinyl isobutyl ether and isoprene; vinyl methyl ether, the divinyl ether of ethylene glycol, and butadiene; vinyl ethyl ether and isobutylene oxide; and trioxane and ethylene oxide.

The other group of substances that undergo cationic polymerization comprises polymeric materials that contain vinylidene ($CH_2=C<$) groups or cyclic ether, cyclic imine, lactone, or lactam groups and can thus be polymerized farther through addition reactions involving these groups. Customarily, in this connection, and in contradistinction to the terms "compound" and "monomer," the terms "polymeric material" and "polymer" refer to a mixture of polymeric molecules of varying molecular weight containing the same type of recurring unit. The vinylidene or cyclic groups that are involved in the cationic polymerization can recur regularly or randomly in the chain of the polymer capable of further polymerization, or they can occur but once or twice in said chain, in which case they are usually terminal groups.

Such partly polymerized materials capable of further polymerization are well known in the art, and many of them are commercially available. Examples are copolymers of allyl glycidyl ether and of vinyloxymethyl methacrylate with typical vinyl monomers, e.g., vinyl acetate and vinyl chloride; N-vinyloxymethyl derivatives of polyamides, particularly polyamides from hexamethylenediamine and adipic acid, from hexamethylenediamine and sebacic acid, and from ε-caprolactam; acetals of polyvinyl alcohol with such aldehydes as p-isopropenylbenzaldehyde, β-glycidyloxypropionaldehyde, and p-vinyloxybenzaldehyde; and the vinyl ethers of such hydroxyl polymers as cellulose, cellulose acetate containing unesterified hydroxyl groups, cellulose acetate-butyrate containing unesterified hydroxyl groups, starch, polyvinyl alcohol, and hydrolyzed ethylene/vinyl acetate copolymers. The invention includes systems containing two or more such polymerizable substances, and also mixtures of one or more such polymerizable substances with one or more polymerizable "monomers" discussed previously.

For reasons of availability, a preferred class of polymers capable of further polymerization through ethylenic unsaturation are those in which the ethylenic unsaturation is in the form of a vinyl ($CH_2=CH-$) group. For the same reason, a preferred class of polymers capable of further polymerization through cyclic groups are those in which the cyclic groups are cyclic ether groups.

THE INITIATOR

The initiators of Formula 1 are silver (I) and cerium (III) salts containing relatively new types of polyboron anions. Their preparations are described in a later section. For reasons of availability, preferred hydrocarbyloxyalkoxy groups represented by Y are those containing 2-12 carbons. Examples are 2-ethoxyethoxy, 2-(1-naphthyloxy)ethoxy, 2-butoxyethoxy, 3-phenoxypropoxy, 4-methoxybutoxy, 10-methoxydecyloxy, and 6-hexyloxyhexyloxy. A more preferred group is that in which any hydrocarbon moieties are lower saturated aliphatic, i.e., loweralkoxy-loweralkoxy, especially those in which the Y group contains a total of at most six carbons. Aliphatic is defined as unsubstituted aliphatic.

For the same reason, preferred hydrocarbylcarbonyl groups represented by Y are those of 2–12 carbon atoms. Examples are acetyl, isobutyryl, cyclohexylcarbonyl, pentamethylbenzoyl, 2-naphthoyl, cyclopropylacetyl, dodecanoyl, and 7-methyloctanoyl. Hydrocarbylcarbonyl groups of 2–7 carbons are especially preferred.

X in Formula 1 can be any halogen, i.e., fluorine, chlorine, bromine, or iodine.

Because of their ease of preparation and the ease of carrying out the process when they are used, initiators of Formula 1 in which $p=n$, q is zero, (i.e., Formulas 8 and 9) and all the halogens represented by X are the same are especially preferred. Initiators in which X is chlorine are especially preferred because of their superior solubility in many liquid monomers that are polymerized in the process of the invention. Silver salts (compounds of Formula 1 in which M is silver) are preferred for reasons of availability.

Examples of initiators that can be used in the products and process of the invention are $Ag_2B_{10}F_{10}$,
$Ag_2B_{10}H_6Cl_4$,
$Ce_2(B_{10}H_4F_6)_3$,
$Ag_2B_{12}H_{10}F_2$,
$Ce_2(B_{12}F_{12})_3$,
$AgB_{12}H_2Cl_{10}$,
$Ag_2B_{10}Br_{10}$,
$Ag_2B_{10}H_2Cl_8$,
$Ce_2(B_{12}H_6Br_6)_3$,
$Ag_2B_{10}H_3Br_7$,
$Ce_2(B_{12}Br_8F_4)_3$,
$Ag_2B_{10}HBr_9$,
$AgB_{12}F_3Br_3I_6$,
$Ag_2B_{12}F_4Cl_3Br_2I_3$,
$Ce_2[B_{12}I_{10}(OCH_2CH_2OCH_3)_2]_3$,
$AgB_{10}H_7I_3$,
$Ce_2(B_{10}H_4I_6)_3$,
$Ag_2B_{12}Cl_{11}COC_6H_5$,
$Ce_2[B_{10}Cl_8(COCH_3)_2]_3$,
$Ag_2B_{10}Br_8(COC_7H_{15})_2$, $Ce_2(B_{10}Cl_9OCH_2CH_2OCH_3)_3$,
$Ag_2B_{10}Br_9COC_6H_5$,
$Ag_2B_{10}Cl_9OH$,
$Ce_2[B_{10}Cl_8(OH)_2]_3$,
$Ag_2B_{12}Br_{11}OH$,
$Ag_2B_{12}F_{12}$, and
$Ag_2B_{10}Cl_8(OH)_2$.

Preferably, the amount of initiator in the photopolymerizable composition will be from about 0.001% to 5% by weight of total polymerizable substance or substances. However it should be understood that even lower amounts can be used so long as they provide catalytic activity. In most compositions, the range is from 0.1% to 3.0%, and this is accordingly an especially preferred range.

In addition to the polymerizable substances and initiators described in the foregoing sections, the photopolymerizable systems that are the products of this invention can contain materials such as thickeners, fillers, pigments, dyes, plasticizers, extenders, inhibitors of thermal polymerization, and the like that are inert to the polymerizable substances and the initiator. The use of a soluble thickener is especially advantageous in preventing undesired flowing of the system when the process is used to prepare a relief image.

PROCESS OF THE INVENTION

Actinic light of wave lengths from about 2500 A. to about 7000 A., especially light predominating in wave lengths from 3000 A. to 5000 A., from any source, can be used in carrying out the process of the invention. When an image is being prepared on a flat surface, as in the preferred embodiment mentioned above and illustrated in subsequent examples, it is desirable to use light in the form of parallel rays.

Sources of light that are particularly useful include sunlight, mercury arcs, fluorescent light bulbs with special phosphors having maximum emission in the ultraviolet, and sun lamps of the type having both tungsten filaments and mercury arcs that emit light in essentially all wave lengths down to about 3000 A. Of these, the mercury-vapor arcs, particularly the sun lamp type, are most suitable; they are usually placed at distances of from 2 to 24 inches from the polymerization system.

The process is operable over a wide range of temperatures and pressures. The actual temperature will depend in part on the polymerized substance or substances, the particular initiator and its concentration, and the light source. The required temperatures are generally lower for substances containing ethylenic unsaturation than for substances containing cyclic groups. Most polymerization of ethylenically unsaturated substances take place readily at from −100° C. to 50° C., temperatures between −25° C. and 25° C. being especially preferred; whereas polymerizations of cyclic substances are best carried out at 10–150° C. The process can vary from subatmospheric to as high as several hundred atmospheres. A preferred range is 0.5–1.5 atmospheres. Especially convenient conditions for carrying out the process are atmospheric pressure or the autogenous pressure of a closed system if one or more of the monomers boils appreciably below the operating temperature.

A solvent is not required, but an inert diluent or mutual solvent for the material to be polymerized and the initiator can be used if desired. Suitable solvents or diluents are hydrocarbons, e.g., pentane, cyclohexane, and toluene, and ethers, e.g., ethyl ether, 1,4-dioxane, and diethylene glycol dimethyl ether.

When a reactor is used, the process can be carried out in conventional chemical equipment that transmits ultraviolet radiation, or that contains a "window" for transmitting radiation. Quartz or glass can be used for this purpose, quartz being preferred because of its higher transmission. As has already been stated, and will be shown specifically in the examples, it is not necessary to exclude molecular oxygen at any stage of the process. The monomer or monomers and the initiator are preferably mixed thoroughly in the absence of actinic light, and the solution thus obtained is then exposed to actinic light. It is not necessary that a completely homogeneous system be formed; i.e., the process can be carried out in the presence of excess, undissolved initator.

The time for polymerization varies with the material to be polymerized, the initiator, the temperature, the pressure, and the light source, among other variables. After an induction period, which may be only about one minute and is frequently no longer than a few minutes under the preferred conditions, and during which the polymerization reaction takes place to only a small extent if at all, polymerization proceeds in a fashion typical of cationic polymerizations, i.e., it goes extremely rapidly even at low temperatures, frequently being complete in less than a minute. The course of the reaction can be followed by one or more of several methods well known to those skilled in the art, e.g., color change, viscosity increase, variation in refractive index ("schlieren" patterns), precipitation of polymer, or solidification of the reaction mixture. The polymer produced can be isolated and purified by conventional procedures.

Because it is not necessary to exclude molecular oxygen at any stage of the process, the process is especially useful for preparing relief images suitable for direct use as printing plates. The presence of atmospheric oxygen will not inhibit the process reaction.

PREPARATION OF INITIATORS

For discussion of their preparation, initiators of Formula 1 can be divided arbitrarily into two groups, viz., those containing the $B_{10}$ nucleus ($n=10$) and those containing the $B_{12}$ nucleus ($n=12$). The $B_{10}$ compounds are prepared as follows:

Ammonium decahydrodecaborate, $(NH_4)_2B_{10}H_{10}$, can be prepared in quantitative yield by the reaction of a decaboryl bis(lower dialkyl sulfide, e.g., decarboryl bis(dimethyl sulfide), $B_{10}H_{12}[(CH_3)_2S]_2$, with liquid ammonia at a temperature between about −50° C. and 0° C. The product is isolated simply by evaporating any excess, unreacted ammonia. This process is described in detail in assignee's copending application Ser. No. 6,853, filed February 5, 1960, in the name of Walter H. Knoth, Jr., now U.S. 3,148,938 issued on September 15, 1964. The decaboryl bis(lower dialkyl sulfide) is prepared by allowing decaborane, $B_{10}H_{14}$, to react with a lower dialkyl sulfide at a temperature of at least 0° C., and preferably at least 25° C., until approximately one mole of hydrogen per mole of decaborane is evolved. This process is described in detail in assignee's copending application Ser. No. 750,862, filed July 25, 1958, in the name of Earl L. Muetterties, now U.S. 3,154,561 issued on October 27, 1964.

Compounds containing the $(B_{10}H_{10-p-q}X_pY_q)^=$ anion (see Formula 1) are made by direct substitution reactions, in which hydrogens bonded to boron are replaced by X or Y groups. These reactions are described in detail in assignee's copending application Ser. No. 135,710, filed August 24, 1961, in the name of Walter H. Knoth, Jr., now abandoned and refiled as application Serial No. 237,392 on November 13, 1962. Thus, halogens (X in the above formula) are introduced into the $B_{10}H_{10}^=$ anion by reaction of the appropriate halogen with $(NH_4)_2B_{10}H_{10}$ in aqueous solution. The corresponding silver or cerium salts are then prepared by conventional metathetical reactions.

For example, in the preparation of $Ag_2B_{10}Cl_{10}$ (Example 18) $(NH_4)_2B_{10}H_{10}$ is reacted with chlorine in aqueous solution at 10–25° C. to give a solution of $(NH_4)_2B_{10}Cl_{10}$. Addition of saturated aqueous cesium fluoride precipitates the corresponding cesium salt, $Cs_2B_{10}Cl_{10}$. Passage of an aqueous solution of the cesium salt through a column packed with an acidic cation-exchange resin gives a solution of the acid $(H_3O)_2B_{10}Cl_{10}$, which is neutralized with silver oxide. Evaporation of the resulting solution gives $Ag_2B_{10}Cl_{10}$. $Ag_2B_{10}I_{10}$ (Example 8) is prepared in a corresponding manner by direct iodination, the iodinating agents being iodine in methanol at 80° C. followed by iodine monochloride with no solvent at 80° C.

Hydrocarbyloxyalkoxy groups (one value of Y in the above formula) are introduced through reaction of the appropriate methyl ether with the appropriate polyboron acid. For example, $Ag_2B_{10}Br_9OCH_2CH_2OCH_3$ (Example 16) is made as follows. $(NH_4)_2B_{10}H_{10}$ is converted to the acid $(H_3O)_2B_{10}H_{10}$ by passage through an acidic cation-exchange column. The aqueous solution of the acid obtained directly by this process is reacted with 1,2-dimethoxyethane at 70–80° C. to give a solution of the substituted acid $(H_3O)_2B_{10}H_9OCH_2CH_2OCH_3$. The acid is neutralized with tetramethylammonium hydroxide to give the corresponding tetramethylammonium salt, which is brominated with bromine in methanol at ordinary temperature to give $[(CH_3)_4N]_2B_{10}Br_9OCH_2CH_2OCH_3$. The corresponding silver salt can be made by converting to the acid $(H_3O)_2B_{10}Br_9OCH_2CH_2OCH_3$, in an acidic cation-exchange column, and neutralizing with silver oxide. The hydrogens attached to the boron in the $$(B_{10}H_9OCH_2CH_2OCH_3)^=$$

anion can be replaced by other halogens directly, for example, by the method described in the preceding paragraph.

Hydrocarbylcarbonyl groups (another value of Y in the above formula) are introduced by reaction of the corresponding acyl chloride with a polyboron acid. For example, reaction of benzoyl chloride with hydrated $$(H_3O)_2B_{10}H_{10}$$

in 1,2-dimethoxyethane at 10° C. gives $$(H_3O)_2B_{10}H_9COC_6H_5$$

Unreacted $(H_3O)_2B_{10}H_{10}$ is separated by precipitation as the tetramethylammonium salt, and the acidic solution is neutralized with tetramethylammonium hydroxide to give the tetramethylammonium salt $$[(CH_3)_4N]_2B_{10}H_9COC_6H_5$$

Reaction of the latter with chlorine in acetonitrile at about 5° C. gives $[(CH_3)_4N]_2B_{10}Cl_9COC_6H_5$, which on mixing with silver nitrate in aqueous solution gives a precipitate of $Ag_2B_{10}Cl_9COC_6H_5$ (Example 17).

Hydroxyl groups (still another value of Y) can be introduced indirectly into the $B_{10}$ neucleus as follows:

$$(NH_4)_2B_{10}H_{10}$$

is reacted with an amide such as dimethylformamide, dimethylacetamide, or N-methylpyrrolidone in the presence of hydrogen chloride. The reaction is exothermic. After the heat of reaction has dissipated itself, the intermediate borane-amide adduct is reacted directly with hot aqueous sodium hydroxide to give the $B_{10}H_9OH^=$ anion. If the dihydroxylated, $B_{10}H_8(OH)_2^=$, anion is desired, the borane-amide reaction mixture is heated externally for an additional period before isolating the adduct for subsequent treatment with sodium hydroxide. The hydroxylated anions can be halogenated, and the silver and cerium salts of the halogenated anions obtained, by methods already described.

Compounds containing the $B_{12}$ nucleus are prepared as follows: Any alkali-metal salt of the acid $(H_3O)_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvent of crystallization can be removed by mixing the product with water and distilling out the organic solvent. The product is then isolated by evaporation. The sodium salt is thus obtained as a monohydrate, $Na_2B_{12}H_{12} \cdot H_2O$, which can absorb water from the atmosphere to form the dihydrate $Na_2B_{12}H_{12} \cdot 2H_2O$. The free acid $(H_3O)_2B_{12}H_{12}$ can be prepared by bringing an aqueous solution of any of its soluble salts into contact with an acidic cation-exchange resin. The process leads to an aqueous solution of the acid, which can be neutralized with metal hydroxides, oxides, or carbonates to give the corresponding metal salts. The latter precipitate as they are formed or can be isolated by evaporation. All these processes are described in detail in assignee's copending application Ser. No. 30,442, filed May 20, 1960, in the name of Henry C. Miller and Earl L. Muetterties.

Compounds containing the $(B_{12}H_{12-p-q}X_pY_q)^=$ anion (see Formula 1) are made by direct substitution reactions, in which hydrogens bonded to boron are replaced by X or Y groups. For example, $[(CH_3)_4N]_2B_{12}Cl_{12}$ is made by reacting excess chlorine with $Na_2B_{12}H_{12}$ in aqueous solution, first at 30° C. and then at 150° C., neutralizing with ammonium hydroxide and precipitating the product by addition of aqueous $(CH_3)_4NCl$ $[(CH_3)_4N]_2B_{12}F_{11}OH$ is made by reacting excess fluorine, diluted with nitrogen, with $NiB_{12}H_{12}$ in aqueous solution at room temperature, neutralizing with ammonium hydroxide to incipient precipitation of $$Ni(NH_3)_6B_{12}F_{11}OH$$

and precipitating the product by mixing the resulting solution with aqueous $(CH_3)_4NCl$.

To make $Cs_2B_{12}H_{5.4}Br_{6.6}$, an etherate of $Na_2B_{12}H_{12}$ is reacted in aqueous methanol at 0–10° C. with slightly more bromine than reacts rapidly. The reaction mixture is filtered and evaporated, and the residue taken up in sodium hydroxide. The resulting solution is evaporated, and the residue is extracted with tetrahydrofuran. Addition of dioxane to the tetrahydrofuran solution precipitates a salt that is converted to the corresponding acid by passage of its aqueous solution through a column packed with an acidic cation-exchange resin. Neutralization of the acid effluent with cesium hydroxide, evaporation, and recrystallization of the residue from water gives a material having the average composition $Cs_2B_{12}H_{5.4}Br_{6.6}$.

$Cs_2B_{12}Br_{12}$ is made by reacting excess bromine with $Na_2B_{12}H_{12} \cdot 2H_2O$ in aqueous methanol at 5–15° C., treating the mixture with excess chlorine, removing hydrogen chloride, hydrogen bromide, and excess bromine by evaporating under reduced pressure, neutralizing with ammonium hydroxide, and precipitating the product with aqueous cesium fluoride.

$[(CH_3)_4N]_2B_{12}H_{11}I$ is prepared by reacting iodine with an equimolar amount of $Na_2B_{12}H_{12} \cdot 2H_2O$ at 25° C. in methanol, neutralizing with ammonium hydroxide, and precipitating the product with aqueous tetramethylammonium chloride.

$Cs_2B_{12}I_{12}$ is prepared by reacting excess iodine with $Na_2B_{12}H_{12} \cdot 2H_2O$ in aqueous methanol, precipitating the resulting $Cs_2B_{12}H_{10}I_2 \cdot CsI$ with aqueous cesium fluoride, reacting the partly iodinated salt with ICl in carbon tetrachloride at 80° C., filtering, extracting iodine and unreacted ICl with carbon disulfide, dissolving the remaining solid in water, and precipitating $Cs_2B_{12}I_{12}$ by addition of aqueous cesium fluoride.

Hydrocarbyloxyalkoxy, hydrocarbonyl, and hydroxyl groups can be introduced into the $B_{12}$ nucleus by the same methods used to introduce them into the $B_{10}$ nucleus (above); the reaction of an acyl halide with $(H_3O)_2B_{12}H_{12}$ can be conducted without a solvent instead of in 1,2-dimethoxyethane.

All the foregoing halogenated $B_{12}$ salts are converted to the corresponding acids by passing their aqueous solutions through columns of acidic cation-exchange resins. To prepare insoluble silver salts, the aqueous solutions of the acids obtained directly from the columns are combined with a solution of a soluble silver salt, e.g., silver nitrate, whereupon the desired silver salt precipitates and is isolated by conventional methods. For soluble silver salts, the solutions of the acids are neutralized with silver oxide and evaporated to dryness to obtain the desired products (Examples 1, 5, 9, 12, 13, 14 and 15). Cerium salts (Example 10) are prepared in the same way from the corresponding cerium compounds.

The following examples illustrate the products and process of this invention.

*Example 1*

Ten grams of trioxane was melted in a quartz reactor, and a partial solution of 0.1 g. of $Ag_2B_{12}Cl_{12}$ in the trioxane was formed by agitating the materials at 75° C. The mixture was irradiated at this temperature with a high-intensity mercury-arc lamp (General Electric AH-6) placed about 3 inches from the reactor. After two minutes, the trioxane polymerized exothermically to give hard, solid polyoxymethylene. The polymer had an inherent viscosity of 0.65.

*Example 2*

A nearly complete solution of 0.03 g. of $Ag_2B_{12}Cl_{12}$ in 4.45 g. of vinyl 2-methoxyethyl ether was formed by agitating the materials in a quartz reactor at about 25° C. The solution was irradiated at this temperature with the mercury-arc lamp of Example 1 approximately 4 inches from the reactor. After about 4–5 minutes, a vigorous, exothermic reaction took place, in which the mixture was converted to viscous, liquid polyvinyl 2-methoxyethyl ether.

*Example 3*

A partial solution of 0.1 g. of $Ag_2B_{12}Cl_{12}$ in 4.45 g. of vinyl 2-methoxyethyl ether was prepared by agitating a mixture of the two compounds at about 25° C. in a quartz reactor. A partial solution of 0.1 g. of $Ag_2B_{12}Cl_{12}$ in 4.45 g. of vinyl isobutyl ether was prepared similarly. Each mixture was heated at 80° C. in the absence of light for 30 minutes. During this time no reaction occurred. The mixture containing vinyl 2-methoxyethyl ether was cooled to about 25° C. and irradiated with the mercury-arc lamp of Example 1 at a distance of 3 inches from the reactor. In three minutes the monomer polymerized vigorously to give polyvinyl 2-methoxyethyl ether.

*Example 4*

Two identical reaction mixtures, each containing 0.05 g. of $Ag_2B_{12}Cl_{12}$ and 4.45 g. of vinyl 2-methoxyethyl ether, were made up by agitating the components at about room temperature in quartz reactors. Both mixtures were cooled to 10° C., and oxygen was bubbled continuously through one mixture but not through the other. Both mixtures were irradiated by the mercury-arc lamp of Example 1 situated 3 inches from each reactor. Within five minutes the monomer in each mixture polymerized vigorously to polyvinyl 2-methoxyethyl ether.

*Example 5*

A solution of 0.1 g. of $Ag_2B_{12}Br_{12}$ in 4.45 g. of diethylene glycol divinyl ether, $$CH_2=CHOCH_2CH_2OCH_2CH_2OCH=CH_2$$

was prepared by warming gently a mixture of the two compounds. The soluiton was cast as a liquid film on a flat glass plate. A metal spoon was laid on the liquid film, and the assembly was then irradiated for 13 minutes with a sun lamp at a distance of one foot. The film was washed quickly with water and then with acetone to remove unpolymerized monomer. A coherent film containing a sharp image of the spoon was obtained; the exposed area that had not been covered by the spoon was a clear, continuous film of a polymer of the divinyl ether of diethylene glycol, whereas in the area that had been shaded by the spoon the surface was bare glass containing no polymer.

*Example 6*

A mixture of 15 g. of medium-viscosity polyvinyl acetate (melting range 180–200° C.) and 8.9 g. of diethylene glycol divinyl ether was warmed and agitated to form a homogeneous, thick syrup. The mixture was cooled to room temperature to give a gummy mass, and about one-third of it was mixed intimately with 0.15 g. of $Ag_2B_{12}Br_{12}$ by repeated pressing between two polytetrafluoroethylene plates in a hydraulic press. The resulting mixture was pressed to a film about 1 mm. thick on an aluminum plate. The film was covered with a sheet of transparent cellophane, and a lithographic negative was placed over the cellophane. The area covered by the negative was exposed for two hours to radiation from a medium-intensity mercury-vapor lamp (General Electric H85–C3). This treatment resulted in formation of a well-resolved image corresponding to that of the negative, with significant hardening due to the polymerization of diethylene glycol divinyl ether in the areas exposed to the light.

Additional examples illustrating the products and process of the invention are summarized in Table I. In each example, a quartz reactor was used, and the procedure was essentially that of Example 2.

TABLE I

| Example No. | Grams Monomer | Grams Initiator | Temp., °C. | Induction Time Before Rapid Polymerization, Hr.: Min. |
|---|---|---|---|---|
| 7 | 4.45 $CH_2=CHOCH_2CH(CH_3)_2$ | 0.1 $Ag_2B_{12}Cl_{12}$ | 15 | 0:03 |
| 8 | 4.5 $CH_2=CHOCH_2CH_2OCH_3$ | 0.1 $Ag_2B_{10}I_{10}$ | 15 | 0:02 |
| 9 | 4.5 $CH_2=CHOCH_2CH_2OCH_3$ | 0.1 $Ag_2B_{12}I_{12}$ | 15 | 0:02 |
| 10 | 4.45 $CH_2=CHOCH_2CH_2OCH_3$ | $Ce_2(B_{12}Cl_{12})_3$ | 15 | 0:35 |
| 11 | 4.45 $CH_2=C(CH_3)$—C<sub>6</sub>H<sub>5</sub> 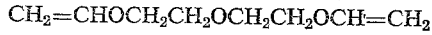 | 0.1 $Ag_2B_{12}Cl_{12}$ | 15 | 0:15 |
| 12 | 4.45 $CH_2=CHOCH_2CH_2OCH_3$ | 0.1 $Ag_2B_{12}F_{11}OH$ | 25 | 0:20 |
| 13 | 4.45 $CH_2=CHOCH_2CH_2OCH_3$ | 0.05 $Ag_2B_{12}Br_{12}$ | 24–28 | 0:03 |
| 14 | 4.45 $CH_2=CHOCH_2CH_2OCH_3$ | 0.01 $Ag_2B_{12}H_{5.4}Br_{6.6}$ | 24–28 | 0:05 |
| 15 | 4.45 $CH_2=CHOCH_2CH_2OCH_3$ | 0.01 $Ag_2B_{12}H_{11}I$ | 24–28 | <18:00 |
| 16 | 4.45 $CH_2=CHOCH_2CH_2OCH_3$ | 0.01 $Ag_2B_{10}Br_9OCH_2CH_2OCH_3$ | 24–28 | 0:17 |
| 17 | 4.45 $CH_2=CHOCH_2CH_2OCH_3$ | 0.009 $Ag_2B_{10}Cl_9COC_6H_5$ | 24–28 | 0:35 |
| 18 | 4.45 $CH_2=CHOCH_2CH_2OCH_3$ | 0.01 $Ag_2B_{10}Cl_{10}$ | 24–28 | 7:30 |
| 19 | 3.6 $O\!\!<\!\!\begin{smallmatrix}CH_2\\ CH_2\end{smallmatrix}\!\!>\!\!C(CH_2Cl)_2$ | 0.02 $Ag_2B_{12}Br_{12}$ | 25 | ca. 5:0 |

TABLE I—Continued

| Example No. | Grams Monomer | Grams Initiator | Temp., °C. | Induction Time Before Rapid Polymerization, Hr.: Min. |
|---|---|---|---|---|
| 20 | 3.6 O⟨CH₂⟩₂C(CH₂Cl)₂ | 0.02 Ag₂B₁₂H₅.₄Br₆.₆ | 25 | 3:00 |
| 21 | 4.5 C₆H₅CH—CH₂\O/ | 0.02 Ag₂B₁₂Cl₁₂ | 15 | 0:40 |
| 22 | 4.5 ClCH₂CH—CH₂\O/ | 0.02 Ag₂B₁₂Cl₁₂ | 15 | 20:30 |
| 23 | 4.5 (cyclic structure) | 0.02 Ag₂B₁₂Cl12 | ca. 15 | 20:30 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A photopolymerizable composition comprising
 (a) a polyboron compound of the formula $$M_2(B_nH_{n-p-q}X_pY_q)_m$$

wherein
  M is a cation selected from the class consisting of
   silver (I) and
   cerium (III);
  X is halogen;
  Y is selected from the class consisting of hydroxyl, hydrocarbyloxyalkoxy free of aliphatic unsaturation, and hydrocarbylcarbonyl free of aliphatic unsaturation;
  $n$ is an even number from 10 through 12 inclusive;
  $p$ is a cardinal number of 1 to 12, inclusive, being equal to $n$ minus $q$ when $q$ is greater than zero,
  $q$ is a cardinal number of 0 to 2, inclusive; $p+q$ being at least at most equal to $n$, and $m$ is the valence of M; and
 (b) at least one substance capable of cationic polymerization.

2. The photopolymerizable composition of claim 1 in which $n$ is 12.

3. The photopolymerizable composition of claim 1 in which $n$ is 10.

4. The photopolymerizable composition of claim 1 in which the amount of said polyboron compound is from about 0.001% to 5% by weight of the total substance capable of cationic polymerization.

5. The photopolymerizable composition of claim 1 wherein the substance capable of cationic polymerization is selected from the class of compounds consisting of ethylenically unsaturated compounds of the formula $$CH_2=C\begin{matrix}X\\Y\end{matrix}$$

wherein Y is selected from the class consisting of hydrogen and lower alkyl and X is a group of up to 12 carbons free of acetylenic and allenic unsaturation selected from the class consisting of hydrocarbyl, hydrocarbyloxy, halohydrocarbyloxy, hydrocarbylcarbonyloxyhydrocarbyloxy, and oxygen-interrupted wherein said substance capable of cationic polymerization compositions that polymerize by ring opening of cyclic groups.

6. The photopolymerizable composition of claim 5 wherein said substance capabl eof cationic polymerization is a vinyl ether of up to 8 carbon atoms.

7. The photopolymerizable composition of claim 5 wherein the amount of said polyboron compound is from about 0.001% to 5% by weight of the total substance capable of cationic polymerization.

8. A photopolymerizable composition comprising a polyboron compound of the formula $M_2(B_{12}H_{12-p}X_p)_m$ wherein M is a cation selected from the class consisting of silver (I) and cerium (III), X is halogen, $m$ is the valence of M, and $p$ is a cardinal number of 1–12 inclusive; and a substance capable of cationic polymerization.

9. The photopolymerizable composition of claim 8 wherein $p$ is 12.

10. The photopolymerizable composition of claim 8 wherein the amount of said polyboron compound is from about 0.001% to 5% by weight of the total substance capable of cationic polyerization.

11. A photopolymerizable composition comprising a polyboron compound of the formula $M_2(B_{10}H_{10-p}X_p)_m$ wherein M is a cation selected from the class consisting of silver (I) and cerium (III), X is halogen, $m$ is the valence of M, and $p$ is a cardinal number of 1–10, inclusive; and a substance capable of cationic polymerization.

12. The photopolymerizable composition of claim 11 wherein $p$ is 10.

13. The photopolymerizable composition of claim 11 wherein the amount of said polyboron compound is from about 0.001% to 5% by weight of the total substance capable of cationic polymerization.

14. A photopolymerizable composition comprising trioxane and from 0.001% to 5% AgB₁₂Cl₁₂ by weight of said trioxane.

15. A photopolymerizable composition comprising vinyl-2-methoxyethyl ether and from 0.001% to 5% AgB₁₂Cl₁₂ by weight of said ether.

16. A photopolymerization process which comprises exposing to light of wave lengths from 2500 A. to 7000 A. a composition comprising a polyboron initiator of the formula $M_2(B_nH_{n-p-q}X_pY_q)_m$ wherein
 M is a cation selected from the class consisting of
  silver (I) and
  cerium (III);
 X is halogen;
 Y is selected from the class consisting of hydroxyl, hydrocarbyloxalkoxy free of alipatic unsaturation, and hydrocarbylcarbonyl free of aliphatic unsaturation;

$n$ is an even number from 10 through 12 inclusive;

$p$ is a cardinal number of 1 to 12, inclusive, being equal to $n$ minus $q$ when $q$ is greater than zero, $q$ is a cardinal number of 0 to 2, inclusive; $p+q$ being at most equal to $n$, and $m$ is the valence of M;

and a substance capable of cationically initiated polymerization.

17. The process of claim 16 wherein the wave length is from 3000 A. to 5000 A. and the process is carried out at a temperature of between $-100°$ and $150°$ C.

18. In the process for the cationic polymerization of a substance, the improvement which comprises the use of a photoinitiator of the formula $M_2(B_nH_{n-p-q}X_pY_q)_m$ wherein M is a cation selected from the class consisting of
silver (I) and
cerium (III);

X is halogen;

Y is selected from the class consisting of hydroxyl, hydrocarbyloxyalkoxy of 2–12 carbon atoms free of aliphatic unsaturation, and hydrocarbylcarbonyl of 2–12 carbon atoms free of aliphatic unsaturation;

$n$ is an even number from 10 through 12 inclusive;

$p$ is a cardinal number of 1 to 12, inclusive, being equal to $n$ minus $q$ when $q$ is greater than zero;

$q$ is a cardinal number of 0 to 2, inclusive; $p+q$ being at most equal to $n$; and $m$ is the valence of M.

No references cited.

MURRAY TILLMAN, *Primary Examiner.*

CARL D. QUARFORTH, *Examiner.*

UNITED STATES PATENT OFFICE
CERTIFICATE OF CORRECTION

Patent No. 3,196,098                                 July 20, 1965

Walter E. Mochel

It is hereby certified that error appears in the above numbered patent requiring correction and that the said Letters Patent should read as corrected below.

Column 4, line 61, for "$AgB_{12}H_2Cl_{10}$" read -- $Ag_2B_{12}H_2Cl_{10}$ --; line 68, for "$AgB_{12}F_3Br_3I_6$" read -- -- $Ag_2B_{12}F_3Br_3I_6$ --; line 71, for "$AgB_{10}H_7I_3$" read -- $Ag_2B_{10}H_7I_3$ --; columns 9 and 10, TABLE I, Example Nos. 8 and 9, second column, for "4.5", each occurrence, read -- 4.45 --; column 11, line 75, strike ou "wherein said substance capable of cationic polymerization" and insert instead -- hydrocarbyloxy containing 2-4 oxygen atoms; and --.

Signed and sealed this 15th day of February 1966.

(SEAL)
Attest:

ERNEST W. SWIDER                          EDWARD J. BRENNER
Attesting Officer                         Commissioner of Patents